(12) United States Patent
Suzuki et al.

(10) Patent No.: US 7,846,339 B2
(45) Date of Patent: Dec. 7, 2010

(54) METHOD FOR REMOVING BORON

(75) Inventors: Hironori Suzuki, Ibaraki (JP); Katsumi Yabusaki, Ibaraki (JP)

(73) Assignee: Kowa Company, Ltd., Nagoya-shi, Aichi (JP)

( * ) Notice: Subject to any disclaimer, the term of this patent is extended or adjusted under 35 U.S.C. 154(b) by 360 days.

(21) Appl. No.: 11/993,588

(22) PCT Filed: Jun. 26, 2006

(86) PCT No.: PCT/JP2006/312724
§ 371 (c)(1),
(2), (4) Date: Dec. 21, 2007

(87) PCT Pub. No.: WO2007/004458
PCT Pub. Date: Jan. 11, 2007

(65) Prior Publication Data
US 2009/0050574 A1  Feb. 26, 2009

Related U.S. Application Data

(60) Provisional application No. 60/695,676, filed on Jun. 30, 2005.

(51) Int. Cl.
*C02F 1/58* (2006.01)
*C02F 101/10* (2006.01)
(52) U.S. Cl. .................. 210/728; 210/725; 210/735; 210/902

(58) Field of Classification Search ............... 210/666
See application file for complete search history.

(56) References Cited

U.S. PATENT DOCUMENTS

| 4,078,129 | A | * | 3/1978 | Yamagata et al. | ........... 528/488 |
| 5,180,497 | A | * | 1/1993 | Sando et al. | ............... 210/665 |
| 5,241,045 | A | * | 8/1993 | Matz | ........................ 528/485 |
| 7,618,538 | B2 | * | 11/2009 | Donaque et al. | ........... 210/652 |
| 2010/0101996 | A1 | | 4/2010 | Suzuki | |

FOREIGN PATENT DOCUMENTS

| JP | 61-153193 | 7/1986 |
| JP | 2002-186976 | 7/2002 |
| JP | 2002-226517 | 8/2002 |
| JP | 2004-292479 | 10/2004 |
| JP | 2006-096846 | 4/2006 |

OTHER PUBLICATIONS

International Search Report dated Jul. 20, 2006.

* cited by examiner

*Primary Examiner*—Peter A Hruskoci
(74) *Attorney, Agent, or Firm*—Knobbe, Martens, Olson & Bear, LLP

(57) ABSTRACT

Boron is removed from an aqueous boron solution by contacting with the aqueous boron solution with a water-soluble cationic polyelectrolyte, and at least one of polyvinyl alcohol and anionic-modified polyvinyl alcohol under an alkaline condition, and then removing the generated coagulation.

6 Claims, 4 Drawing Sheets

[Fig.1]
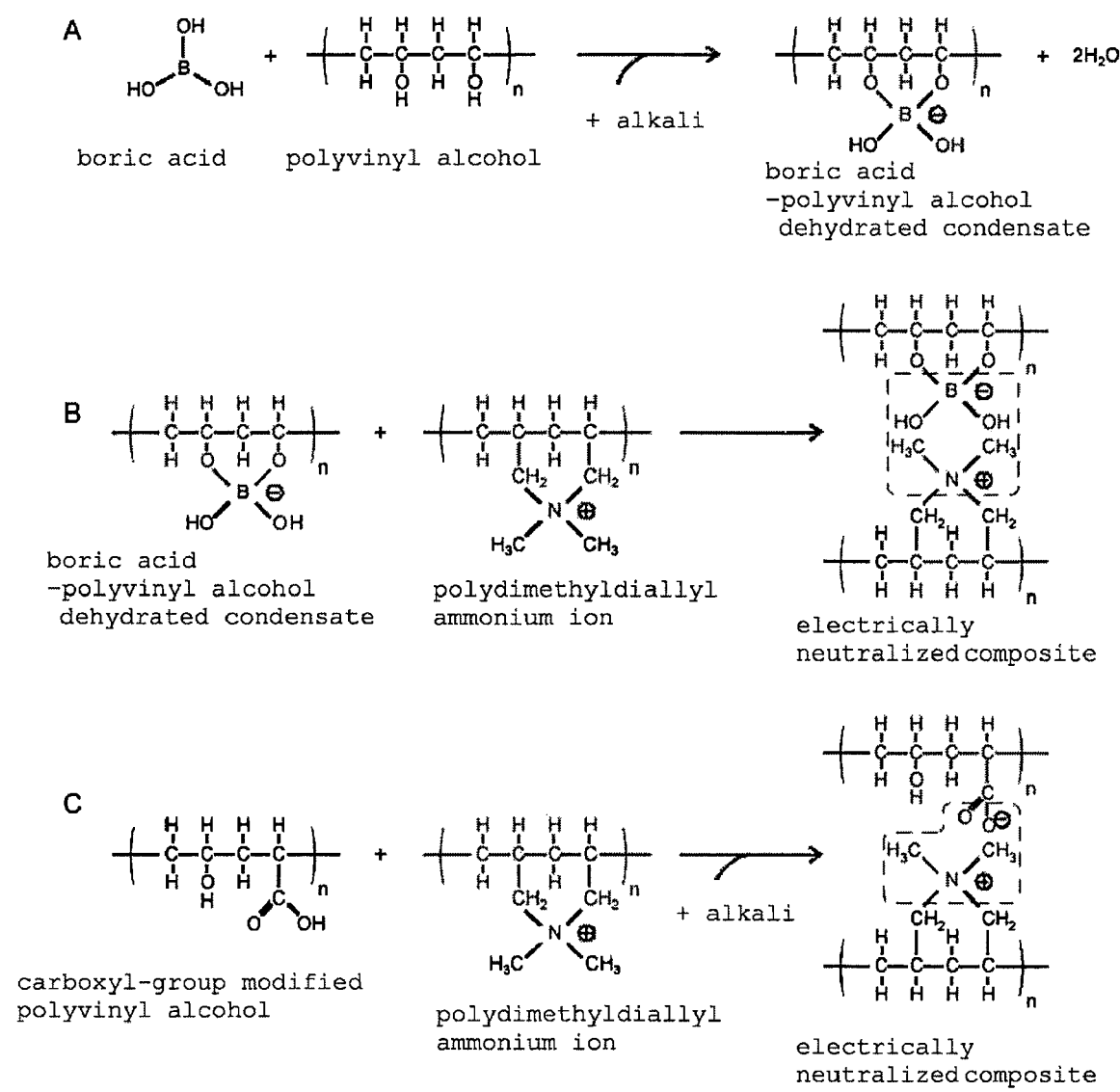

[Fig.2]
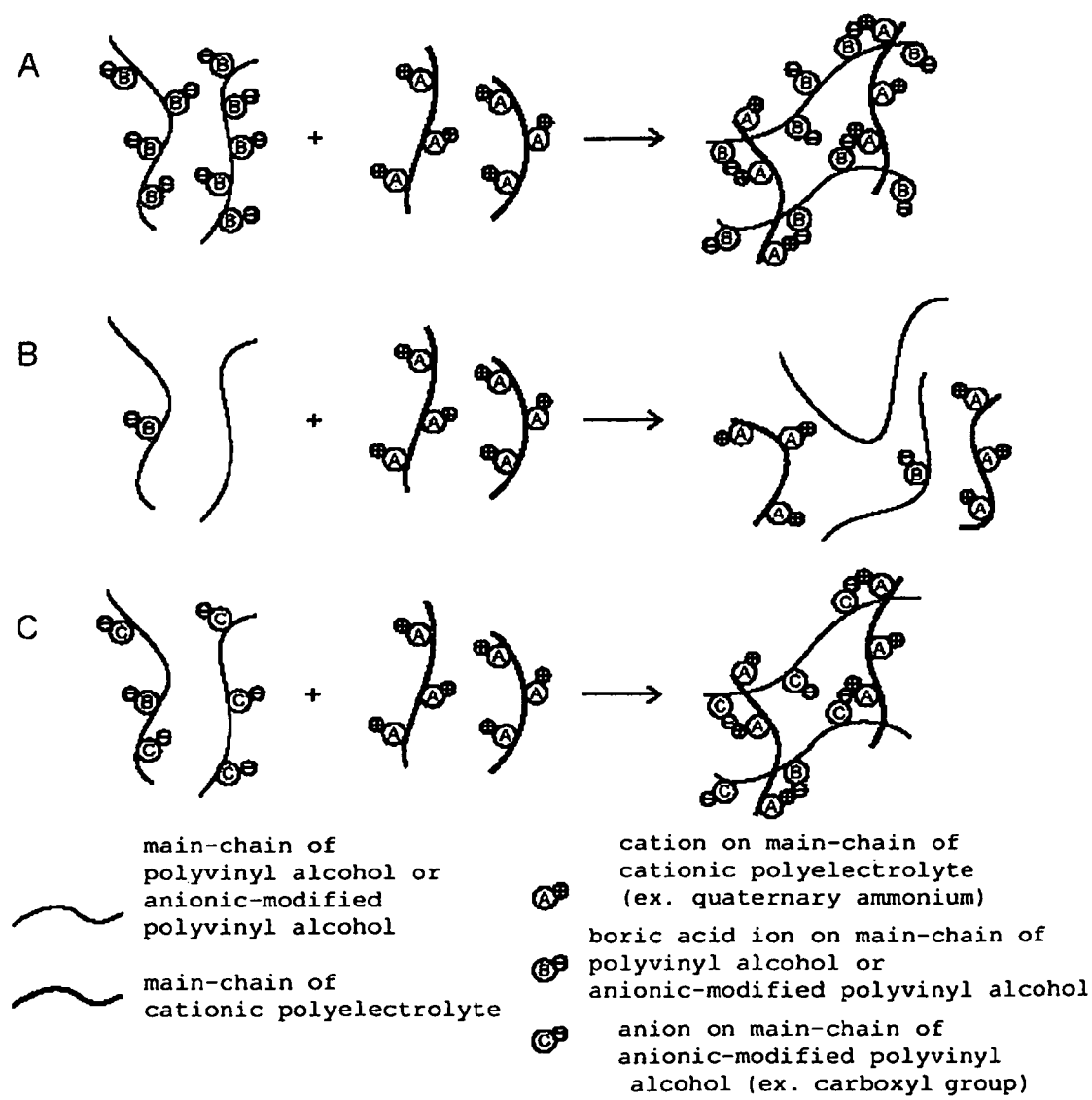

[Fig.3]
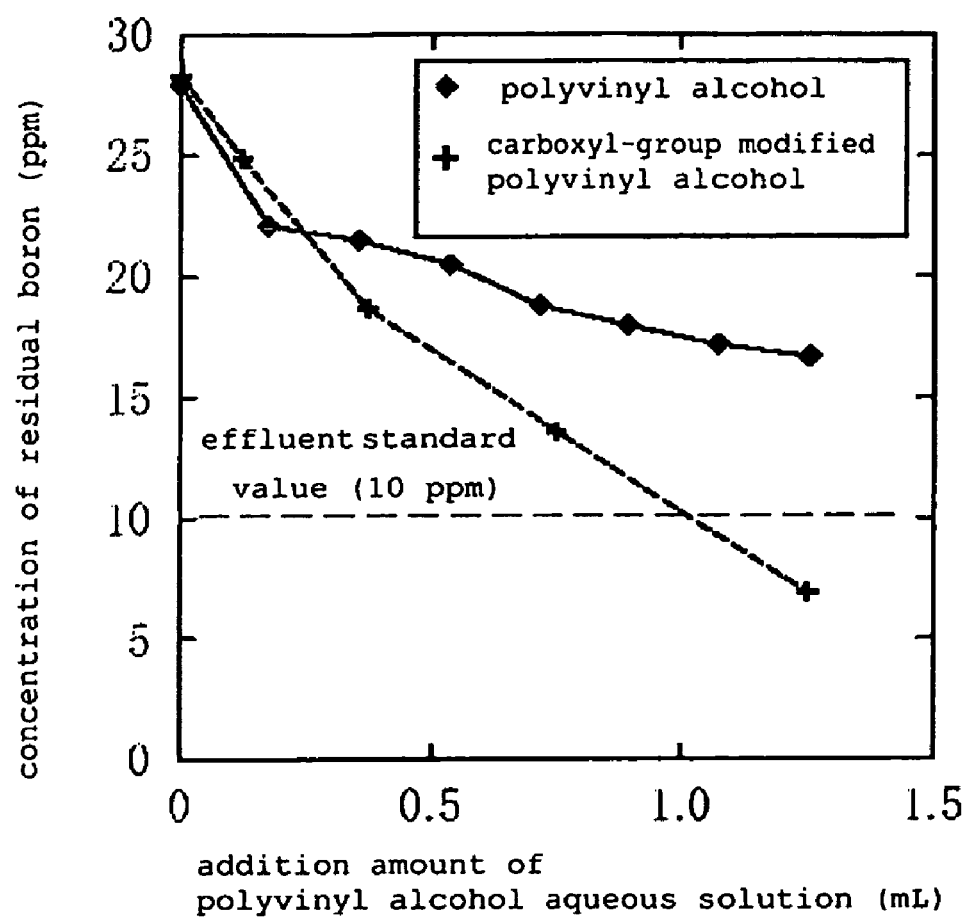

[Fig.4]
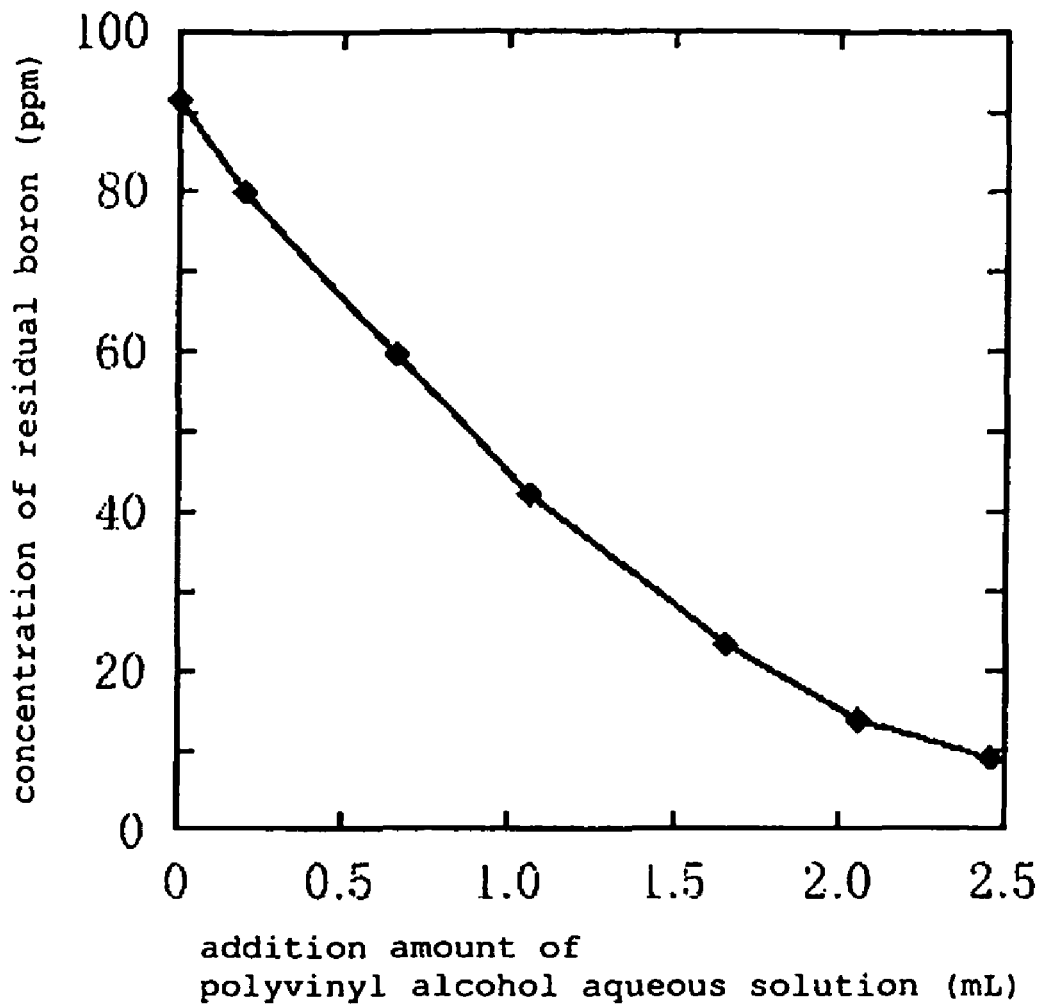

METHOD FOR REMOVING BORON

CROSS-REFERENCE TO RELATED APPLICATIONS

This application is the U.S. National Phase under 35 U.S.C. §371 of International Application PCT/JP2006/312724, filed Jun. 26, 2006, which was published in a non-English language, which claims priority to U.S. Provisional Application No. 60/695,676, filed Jun. 30, 2005.

TECHNICAL FIELD

The present invention relates to an agent for removing boron and a method of removing boron from an aqueous boron solution. More specifically, the present invention relates to an agent for removing boron and a method of removing boron capable of removing boron from, in particular, an aqueous boron solution with low concentration, and which can suppress the amount of generated precipitate (sludge).

BACKGROUND ART

The Water Pollution Prevention Law was revised in June, 2001, and, in addition to the conventional regulation of the discharge of heavy metals and organochlorine compounds, the regulation of discharge of boron started. The standard for discharge of boron and its compounds is set below 10 mg per 1 L of water (below 10 ppm) in freshwater environments such as a river, and below 230 mg per 1 L of water (below 230 ppm) in seawater environments.

Conventionally, the following methods have been employed for treating boron-containing waste water: a method in which magnesium oxide in an amount 5 to 10 times or more (molar ratio) as large as that of boron is added to a boron-containing waste water, the pH is adjusted to 10 or higher with alkali metal hydroxide to form insoluble precipitate, and then the formed insoluble precipitate is removed; a method in which a large amount of aluminum salt is added, the pH is adjusted to 10 or higher with slaked lime to form insoluble precipitate, and the insoluble precipitate is removed similarly as in the above-mentioned method; a method in which zirconium oxide in an amount equivalent to that of boron is added to form insoluble precipitate, and the insoluble precipitate is removed; and a method in which a boron-selective ion exchange resin is brought into contact with a boron-containing waste water to remove boron by adsorption.

However, the methods in which an insoluble precipitate is formed using magnesium oxide or aluminum salt for removing boron each require a large amount of chemical agent which generate a large amount of precipitate, and thus are not economical. According to the method of removing boron using zirconium oxide, boron can be removed with a smaller amount of chemical agent and the amount of generated precipitate is smaller as compared with the above-mentioned methods, but the solid-liquid-separation properties of the generated sludge is low, and moreover, since zirconium is a rare metal, such a method is not economical. The method using a boron-selective ion exchange resin also requires a large amount of expensive boron-selective ion exchange resin, and thus is not economical.

Under such a technical background, methods of removing boron that are performed simply and with low cost and that have sufficient effects have been studied. For example, there has been reported a method of removing boron in a solution using a gel-like polyvinyl alcohol (JP 2002-186976 A). However, according to this method, boron is adsorbed on the surface of the gel-like polyvinyl alcohol for separating a boron-binding gel. Thus, although a large amount of chemical agent is used, the amount of boron that can be bound is small. In order to remove boron from an aqueous solution containing boron at high concentration and to reduce the boron concentration below 10 ppm by using this method, there arises a problem in that a large amount of chemical agent and a prolonged reaction time are required. Moreover, the shape of the gel needs to be adjusted at the gel formation phase in order that a large amount of boron is bonded. In addition, there is a problem in that the strength and manner of use of the gel need to be adjusted, and thus the above-mentioned method is far from being a simple method.

DISCLOSURE OF THE INVENTION

The object of the present invention is to provide an agent for removing boron capable of sufficiently removing boron from an aqueous boron solution with a small amount of chemical agent and capable of suppressing the amount of generated precipitate, and a method of removing boron using the agent.

The inventors of the present invention carried out extensive researches, and, as a result, found that boron can be efficiently removed from an aqueous boron solution by bringing a water-soluble cationic polyelectrolyte, and at least one of polyvinyl alcohol and anionic-modified polyvinyl alcohol into contact with an aqueous boron solution. The present invention has been accomplished based on this finding.

More specifically, the present invention is as follows:

(1) An agent for removing boron comprising a water-soluble cationic polyelectrolyte, and at least one of polyvinyl alcohol and anionic-modified polyvinyl alcohol.

(2) An agent for removing boron comprising a water-soluble cationic polyelectrolyte and anionic-modified polyvinyl alcohol.

(3) The agent for removing boron according to Item (1) or (2), in which the water-soluble cationic polyelectrolyte is one or more selected from the group consisting of a neutral polyalkylamine, a quaternary polyalkylamine, a neutral polyhydroxyalkylamine, and a quaternary polyhydroxyalkylamine;

(4) The agent for removing boron according to Item (1) or (2), in which the water-soluble cationic polyelectrolyte is polydimethyldiallylammonium chloride and/or polyallylamine;

(5) The agent for removing boron according to Item (1) or (2), in which an anionic functional group of anionic-modified polyvinyl alcohol is one or more selected from the group consisting of carboxyl group, sulfo group, and phosphono group;

(6) The agent for removing boron according to Item (1) or (2), in which an anionic functional group of anionic-modified polyvinyl alcohol is carboxyl group and/or sulfo group; and (7) A method of removing boron comprising bringing the agent for removing boron according to any one of Items (1) to (6) into contact with an aqueous boron solution under an alkaline condition for removing boron.

BRIEF DESCRIPTION OF THE DRAWINGS

FIG. 1(A) illustrates a bonding manner of boric acid and polyvinyl alcohol. FIG. 1(B) illustrates a crosslinking manner of a boric acid-polyvinyl alcohol dehydrated condensate ion and polydimethyldiallyl ammonium ion. FIG. 1(C) illustrates a crosslinking manner of carboxyl group modified polyvinyl alcohol ion (anionic-modified polyvinyl alcohol ion) and polydimethyldiallyl ammonium ion.

FIG. 2(A) illustrates the principle of coagulation in which polyvinyl alcohol is brought into contact with an aqueous boron solution with high concentration. FIG. 2(B) illustrates the principle of a decrease in the coagulation rate in which polyvinyl alcohol is brought into contact with an aqueous boron solution with low concentration. FIG. 2(C) illustrates the principle of coagulation in which anionic-modified polyvinyl alcohol is brought into contact with an aqueous boron solution with low concentration.

FIG. 3 illustrates the relationship between the addition amount of each polyvinyl alcohol and the concentration of residual boron in which polydimethyldiallylammonium chloride, and polyvinyl alcohol or carboxyl group modified polyvinyl alcohol are added to an aqueous boron solution with low-concentration.

FIG. 4 illustrates the relationship between the addition amount of carboxyl group modified polyvinyl alcohol and the concentration of residual boron in which polydimethyldiallylammonium chloride and carboxyl group modified polyvinyl alcohol are added to an aqueous boron solution with high concentration.

BEST MODE FOR CARRYING OUT THE INVENTION

An agent for removing boron of the present invention is characterized by comprising a water-soluble cationic polyelectrolyte and at least one of polyvinyl alcohol and anionic-modified polyvinyl alcohol.

The cationic polyelectrolyte turns into a polymer cation in an aqueous boron solution. The polymer cation is crosslinked with an anion of a boric acid-polyvinyl alcohol dehydrated condensate described later to form an electrically neutralized composite. The electrically neutralized composite is coagulated and precipitated.

There is no limitation on the cationic polyelectrolyte for use in the agent for removing boron of the present invention, insofar as it is water soluble. In usual, neutral polyamine and quaternary polyamine can be used, and preferably neutral or quaternary polyalkylamine and neutral or quaternary polyhydroxyalkylamine can be used. Specific examples of such cationic polyelectrolyte include polydimethyldiallylammonium chloride, polyallylamine, polyethyleneimine, a condensate of dialkylamine and epichlorohydrin, a condensate of alkylene dichloride and polyalkylene amine, a condensate of dicyandiamide and formaldehyde, a condensate of vinyl acetate and N,N-dimethylaminoethyl acrylamide or a quaternary salt thereof, a condensate of vinyl acetate and N,N-dimethylaminoethyl acrylate or a quaternary salt thereof, or the like. Polydimethyldiallylammonium chloride is preferred.

The molecular weight of a water-soluble cationic polyelectrolyte for use in the agent for removing boron of the present invention can be optimally determined according to the concentration of boron in an aqueous boron solution to be applied. Usually, it is preferred that the molecular weight be 1,000 to 1,000,000, more preferably 5,000 to 200,000.

A water-soluble cationic polyelectrolyte can also be manufactured in a routine manner, and a commercially-available water-soluble cationic polyelectrolyte can also be used.

Polyvinyl alcohol forms, at the hydroxyl-group site, a dehydrated condensate of boric acid and borax which are present in an aqueous boron solution. Specifically, polyvinyl alcohol is mixed in an aqueous solution containing boric acid and/or borax, and the mixture is rendered alkaline with a pH adjuster. Thus, the boric acid and borax in the solution and polyvinyl alcohol are dehydrated and condensed. A hydroxyl group is bonded to boron of a dehydrated condensate, thereby obtaining anion having a negative charge at a side chain (FIG. 1-A).

The polyvinyl alcohol for use in the agent for removing boron of the present invention is a vinyl resin obtained by saponifying polyvinyl acetate obtained by polymerizing vinyl acetate, or the like. The degree of polymerization of polyvinyl alcohol can be determined according to the concentration of boron of an aqueous boron solution to be applied. The degree of polymerization of polyvinyl alcohol is not limited, and is preferably 50 to 8,000, and more preferably 500 to 4,000. Moreover, an average saponification degree is not limited similarly, and is preferably 30.0 mol % or more and more preferably 60.0 mol % or more.

When boron is removed from an aqueous boron solution with high concentration, it is preferred to use the above-mentioned polyvinyl alcohol. This is because a large amount of boron can be bonded to the hydroxyl group of polyvinyl alcohol. When a large amount of boron is bonded to polyvinyl alcohol, an anion of a boric acid-polyvinyl alcohol dehydrated condensate having sufficient negative charges at the side chain is formed, and is crosslinked with a polymer cation. Thus, these polymers are easily coagulated and boron can be removed efficiently (FIG. 2-A).

On the other hand, in an aqueous boron solution with low concentration, the amount of boron to be condensed with the hydroxyl group of polyvinyl alcohol is small. Therefore, negative charges are not sufficiently supplied to a boric acid-polyvinyl alcohol dehydrated condensate, and crosslinking with a polymer cation is hard to occur, whereby the generation rate of the coagulation is lowered (FIG. 2-B).

In order to remove boron from an aqueous boron solution with low concentration, anionic-modified polyvinyl alcohol is preferably used in place of the above-mentioned polyvinyl alcohol or together with the above-mentioned polyvinyl alcohol.

The anionic-modified polyvinyl alcohol is provided by substituting a part of the hydroxyl groups of polyvinyl alcohol with a substituent containing an anionic group. The anionic-modified polyvinyl alcohol itself, which has a given amount or more of negative charges at the side chain, can form a composite with a cationic polymer in an aqueous solution (FIG. 1-C). Therefore, even when the concentration of boron in an aqueous boron solution is low and the amount of boron which can be bonded to the hydroxyl group of polyvinyl alcohol is small, polyvinyl alcohol is easily crosslinked with a polymer cation with anion contained in the polyvinyl alcohol itself, and thus boron can be efficiently removed (FIG. 2-C).

The degree of polymerization of the anionic-modified polyvinyl alcohol for use in the present invention can be determined depending on the concentration of aqueous boron solution to be applied. The degree of polymerization of the anionic-modified polyvinyl alcohol is not limited, and usually, is preferably 50 to 8,000, and more preferably 500 to 4,000. The average saponification degree of the anionic-modified polyvinyl alcohol is not limited similarly, and usually, is preferably 30.0 mol % or more, and more preferably 60.0 mol % or more.

The modification degree of an anionic group is adjusted according to the concentration of boron of an aqueous boron solution to be applied. Usually, the modification degree is, but is not limited to, preferably 0.1 to 20 mol %, and more preferably 1.0 to 10 mol %. The types of an anionic group are not limited, and usually, it is preferred to use carboxyl group, sulfo group, phosphono group, and the like, and it is more preferred to use carboxyl group and sulfo group in view of cost efficiency and the ease of preparation.

Examples of the carboxyl-group modified polyvinyl alcohol are a so-called copolymer modified polyvinyl alcohol obtained by copolymerizing vinyl acetate and acrylic ester, or the like, followed by saponifying, and a so-called post-modified polyvinyl alcohol obtained by introducing carboxyl group directly into polyvinyl alcohol.

As methods for introducing carboxyl group into polyvinyl alcohol, the following are, for example, mentioned: a method in which half esterification of polyvinyl alcohol is performed with maleic anhydride, or the like; a method in which polyvinyl alcohol is subjected to a substitution reaction with monochloroacetic acid, or the like; a method in which polyvinyl alcohol is subjected to a Michael addition reaction with acrylic acid, or the like; and a method in which a Michael addition reaction with acrylonitrile, acrylamide, or the like is similarly performed, followed by hydrolysis. Of those, the method in which Michael addition reaction of acrylonitrile or acrylamide is performed, followed by hydrolysis is preferred because the resultant is imparted with a high reactivity and a high modification degree.

As methods for introducing sulfo group into polyvinyl alcohol, the following are, for example, mentioned: a method in which copolymerization of vinyl acetate and vinyl sulfonic acid, styrene sulfonic acids, allylsulfonic acid, methallylsulfonic acid, 2-acrylamide-2-methyl propane sulfonic acid (hereinafter, referred to as AMPS), or the like, is performed, followed by saponifying; a method in which polyvinyl alcohol is subjected to a Michael addition reaction with vinyl sulfonic acid or its salt, AMPS or its salt, or the like. Of those, the method in which polyvinyl alcohol is subjected to a Michael addition reaction with AMPS or its salt is preferred because the resultant is imparted with a high reactivity and a high modification degree.

As a method of introducing phosphono group into polyvinyl alcohol, a method is, for example, mentioned in which polyvinyl alcohol is graft polymerized with unsaturated monomers such as (meth)acrylates including phosphono group, by using an initiator such as ceric salt, persulfate, or the like, or electron beam irradiation.

In the agent for removing boron of the present invention, the proportion of a water-soluble cationic polyelectrolyte, and at least one of polyvinyl alcohol and anionic-modified polyvinyl alcohol can be determined according to the concentration of boron in an aqueous boron solution to be applied. When applied to an aqueous boron solution with a concentration of boron of 50 to 500 ppm, usually, it is preferred that a cationic polyelectrolyte and polyvinyl alcohol be contained, and the ratio of a cationic polyelectrolyte and polyvinyl alcohol is preferably 5:1 to 1:20, and more preferably, 7:5 to 1:10. On the other hand, when an aqueous boron solution with a concentration of boron of 1 to 50 ppm, usually, it is preferred that a cationic polyelectrolyte and an anionic-modified polyvinyl alcohol be contained, and the ratio of a cationic polyelectrolyte and an anionic-modified polyvinyl alcohol is preferably 8:1 to 1:20, and more preferably 5:1 to 1:10.

The agent for removing boron of the present invention can also be used in combination with another chemical agent, and the like, which are used in usual liquid waste treatment.

The form of a water-soluble cationic polyelectrolyte, polyvinyl alcohol, and an anionic-modified polyvinyl alcohol contained in the agent for removing boron of the present invention is not particularly limited insofar as objects of the present invention can be achieved. Each polymer can be formed into an aqueous solution form or a powder form. When provided in a powder form, in order to uniformly disperse the powders into an aqueous-boron solution, it is preferred to dissolve the powders into water at the time of use.

A kit of an agent for removing boron may be provided by combining cationic polyelectrolyte, and at least one of polyvinyl alcohol and anionic-modified polyvinyl alcohol, which are formed into the above-mentioned forms.

According to the method of removing boron of the present invention, the agent for removing boron of the present invention is brought into contact with an aqueous boron solution under an alkaline condition, a composite including boron is formed and precipitated, and the precipitate is removed.

The method of removing boron of the present invention refers to a method of removing boron including the steps of bringing water-soluble cationic polyelectrolyte, and at least one of polyvinyl alcohol and anionic-modified polyvinyl alcohol into contact with an aqueous boron solution and adjusting the pH of the solution to alkaline. There is no limitation on the order of the steps of adding each polymer and adjusting the pH. More specifically, the water-soluble cationic polyelectrolyte, and at least one of polyvinyl alcohol and anionic-modified polyvinyl alcohol may be simultaneously added to an aqueous boron solution or may be separately added. The adjustment of pH may be performed before or after the addition of each polymer, or may be performed simultaneously with the addition of each polymer. Usually, it is preferred that at least one of polyvinyl alcohol and anionic-modified polyvinyl alcohol be added, a boric acid-polyvinyl alcohol dehydrated condensate be formed, the pH be adjusted to alkaline to form an anion of the condensate, and then cationic polyelectrolyte be added for generating a coagulation. By removing the coagulation thus formed, boron can be removed from an aqueous boron solution.

In the method of removing boron of the present invention, a batch method can be employed in which the addition of at least one of polyvinyl alcohol and anionic-modified polyvinyl alcohol, the adjustment of pH, the addition of cationic polyelectrolyte, and the removal of precipitate are performed only once (a batch method) However, it is preferred to employ a dividing method in which each polymer is divided into small portions, and the procedures of the addition of at least one of polyvinyl alcohol and anionic-modified polyvinyl alcohol, the adjustment of pH, the addition of cationic polyelectrolyte, and the removal of precipitate are repeated several times, whereby boron is removed. According to the dividing method, it is possible to remove a larger amount of boron by the use of the same amount of a chemical agent by the batch method.

In addition, the use of at least one of polyvinyl alcohol and anionic-modified polyvinyl alcohol as a leaching agent makes it possible to efficiently remove boron by removing boron from a large amount of incinerated ash, and then reacting the waste liquid with cationic polyelectrolyte.

The method of removing boron of the present invention can also be used in combination with methods employed in usual waste liquid treatment. For example, when the formation and coagulation of a macromolecular complex are impeded by the influence of coexistence salt, it is possible to promote crosslinking and coagulation between a polymer cation and boric acid-polyvinyl alcohol anion by a method using a salting agent such as an inorganic alkaline metal salt, alkaline earth metal salt, ammonium salt, aluminum salt, or the like, and an iron salt such as iron (III) chloride, iron (III) sulfate, or iron (II) sulfate. Since there is a tendency that polymers which cannot form a composite are accumulated, in particular, in an aqueous boron solution with low concentration and a total organic carbon (TOC) in the aqueous solution becomes high, the above-mentioned methods are effective.

In the method of removing boron of the present invention, the concentration of water-soluble cationic polyelectrolyte and at least one of polyvinyl alcohol and anionic-modified polyvinyl alcohol can be optimally determined according to the concentration of boron of an aqueous boron solution to be applied, and the concentration is not limited insofar as the aqueous boron solution does not form a gel. Usually, it is preferred that the concentration of cationic polyelectrolyte be 0.5 to 100 times that of boron, and the concentration of at least one of polyvinyl alcohol and anionic-modified polyvinyl alcohol concentration be 1 to 200 times that of boron. It is preferred to use the above-mentioned polymers in such a manner that the total concentration thereof may be 3% by weight or less, relative to the aqueous boron solution.

EXAMPLES

Hereinafter, the present invention will be described in more detail with reference to Examples.

Example 1

20% by weight of aqueous carboxyl-group modified polyvinyl alcohol solution (Kuraray K polymer KM-618, manufactured by Kuraray CO., LTD., polymerization degree: 1,800, saponification degree: 92.5 to 95.5 mol %, viscosity (4%, 20° C.): 26.0 to 34.0 mPa·s, sodium acetate: 1.5% by weight or less) and 28.1% by weight of aqueous polydimethyldiallylammonium chloride solution (PAS-H-5L, manufactured by Nitto Boseki Co., Ltd., molecular weight: 40,000) were prepared. Each of the solutions was dropped while being stirred into 50 ml of 30-ppm aqueous boric acid solution to obtain a mixture. Subsequently, a 10-N aqueous sodium hydroxide solution was added to the mixture, the pH of the solution was adjusted to 9.0 to 9.5 to form a composite, and the generated precipitate was removed. The procedures of dropping each of the polymers, adjusting the pH, and removing the precipitate were repeated 10 times, and the concentration of residual boron relative to the addition amount of chemical agent (total amount) was determined with an ICP emission spectrometer (manufactured by HORIBA Ltd.). As a Comparative Example, the same experiment was conducted using, in place of carboxyl-group modified polyvinyl alcohol, 20% by weight of aqueous polyvinyl alcohol solution, (Kuraray poval PVA110, manufactured by Kuraray CO., LTD., polymerization degree: 1,000, saponification degree: 98.0 to 99.0 mol %, viscosity: 10.2 to 11.8).

The measurement results are shown in FIG. 3. When 1.25 ml of aqueous carboxyl-group modified polyvinyl alcohol solution was dropped, the concentration of boron was 6.9 ppm, which was lower than the effluent standard value (10 ppm). In contrast, in the case where nonionic polyvinyl alcohol was used, the change in the concentration of boron slowed down, and even when the same amount of chemical agent was added, the concentration of boron was 16.7 ppm. The dropping amount of the aqueous polydimethyldiallylammonium chloride solution was 135 µl.

The results show that the use of anionic-modified polyvinyl alcohol is effective for lowering the concentration of boron below 10 ppm from an aqueous boron solution with low concentration.

Example 2

The aqueous carboxyl-group modified polyvinyl alcohol solution and the aqueous polydimethyldiallylammonium chloride solution which were used in Example 1 were separately dropped while being stirred into 50 ml of 90-ppm aqueous boric acid solution. Subsequently, a 10-N aqueous sodium hydroxide solution was added, the pH of the solutions was adjusted to 9.0 to 9.5 to form composites, and the generated precipitates were removed. The procedure of dropping each of the polymers, adjusting the pH, and removing precipitates were repeated 12 times, and the concentration of residual boron relative to the addition amount of chemical agent (total amount) was determined with an ICP emission spectrometer.

The measurement results are shown in FIG. 4. When 2.45 ml of aqueous carboxyl-group modified polyvinyl alcohol solution was dropped, the concentration of boron was 8.9 ppm, which was lower than the effluent standard value (10 ppm). The dropping amount of the aqueous polydimethyldiallylammonium chloride solution was 360 µl.

It was found that the use of anionic-modified polyvinyl alcohol makes it possible to lower the concentration of boron below 10 ppm from an aqueous boron solution with high concentration.

Example 3

The method using the agent for removing boron of the present invention (Example 3) and the coagulation process (Comparative Example 1) in which sulphate and calcium hydroxide were combined, were compared in the amount of chemical agent used and the amount of generated precipitate. A chemical agent required for removing 25% boron from 50 ml of 200 ppm aqueous boron solution and the required amount thereof are shown in Table 1. In Example 3, an aqueous nonionic polyvinyl alcohol solution (20% by weight) (Kuraray poval PVA102, manufactured by Kuraray CO., LTD., polymerization degree: 200, saponification degree: 98.0 to 99.0 mol %, viscosity: 2.7 to 2.8), the aqueous polydimethyldiallylammonium chloride solution (28.1% by weight), and the sodium hydroxide were dropped into an aqueous boron solution to form a composite in the same manner as in Example 1. In Comparative Example 1, aluminum sulfate and calcium hydroxide were added to an aqueous boron solution, followed by shaking for 30 minutes. Each of the resultants was subjected to solid liquid separation using a centrifugal separator, the obtained precipitates were dried and weighed.

The results are shown in Table. 1. With respect to the required amount of chemical agent in Comparative Example 1, the total weight of aluminum sulfate and calcium hydroxide was 1.60 g, and in contrast, in Example 3, the total weight of chemical agent calculated from the weight of the added chemical agent was 0.25 g. With respect to the generated amount of precipitate (dry), Comparative Example 1 showed 1.47 g, and in contrast, Example 3 showed 0.10 g. The results show that, in the method using the agent for removing boron of the present invention, a smaller amount of a chemical agent may suffice and the amount of generated precipitate is smaller, as compared with the coagulation process using sulphate and calcium hydroxide.

TABLE 1

| Reagent (g) | Aluminum sulfate | Calcium hydroxide | PVA* | PDDA** | Sodium hydroxide | Total weight | Boron concentration (ppm) | Precipitate (g) |
|---|---|---|---|---|---|---|---|---|
| Control | — | — | — | — | — | — | 193 | — |
| Example 3 | — | — | 0.10 | 0.10 | 0.05 | 0.25 | 151 | 0.10 |
| Comparative Example 1 | 0.10 | 1.50 | — | — | — | 1.60 | 155 | 1.47 |

*Polyvinyl alcohol
**Polydimethyldiallylammonium chloride

Example 4

In an aqueous boron solution with low concentration, the method using the agent for removing boron of the present invention (Example 4) and the coagulation process in which sulphate and calcium hydroxide were combined (Comparative Example 2) were compared in the boron removing ability. The total weight of chemical agents to be used for 50 ml of 30 ppm aqueous boron solutions was set to 0.30 g in each method. The amount of each chemical agent used was shown in Table 2. In Example 4, the aqueous carboxyl-group modified polyvinyl alcohol solution (20% by weight), the aqueous polydimethyldiallylammonium chloride solution (28.1% by weight) and sodium hydroxide were dropped into the aqueous boron solution to form a composite in the same manner as in Example 1. In Comparative Example 2, aluminum sulfate and calcium hydroxide were added to an aqueous boron solution, followed by shaking for 30 minutes. Each of the resultants was subjected to solid liquid separation using a centrifugal separator and the concentration of boron of the supernatant was measured with an ICP emission spectrometer.

The results are shown in Table 2. In Comparative Example 2, the concentration of boron was reduced to 16.2 ppm maximum, and in contrast, in Example 4, the concentration of boron was lowered to 6.9 ppm. The results show that the method using the agent for removing boron of the present invention is excellent in the boron removing ability, as compared with the coagulation process using sulphate and calcium hydroxide.

TABLE 2

| Reagent (g) | Aluminum sulfate | Calcium hydroxide | PVA* | PDDA** | Sodium hydroxide | Total weight | Concentration of boron (ppm) |
|---|---|---|---|---|---|---|---|
| Control | — | — | — | — | — | — | 28.5 |
| Example 4 | — | — | 0.25 | 0.04 | 0.01 | 0.30 | 6.9 |
| Comparative Example 2 | 0.10 | 0.20 | — | — | — | 0.30 | 16.2 |

*Carboxyl-group modified polyvinyl alcohol
**Polydimethyldiallylammonium chloride

INDUSTRIAL APPLICABILITY

By the use of the agent for removing boron of the present invention, boron can be efficiently removed with a smaller amount of chemical agent, and the concentration of boron can be reduced below 10 ppm. The present invention is excellent in the effect of removing boron from, in particularly, an aqueous-boron solution with low concentration. The present invention eliminates the necessity of a large-sized waste precipitate treatment facility because the amount of generated precipitate is small, and the agent for removing boron of the present invention is soluble in acid and can be condensed into a boron-containing liquid. The present invention can be used for removing boron contained in waste liquids containing boric acid and borax (sodium borate) which are discharged from nickel plating industries, metal heat-treatment industries, glass processing industries, enamel manufacturing industries, clay roofing tile manufacturing industries, glaze manufacturing industries, or hot springs.

What is claimed is:

1. A method of removing boron, comprising;
    contacting an agent for removing boron with an aqueous boron solution under an alkaline condition to form a precipitate, wherein the agent comprises a water-soluble cationic polyelectrolyte, and an anionic-modified polyvinyl alcohol in a ratio to form said precipitate; and
    removing the precipitate from the aqueous boron solution, thereby removing boron.

2. The method according to claim 1, wherein the water-soluble cationic polyelectrolyte is one or more selected from the group consisting of a neutral polyalkylamine, a quaternary polyalkylamine, a neutral polyhydroxyalkylamine, and a quaternary polyhydroxyalkylamine.

3. The method according to claim 1, wherein the water-soluble cationic polyelectrolyte is a polydimethyldiallylammonium chloride and/or a polyallylamine.

4. The method according to claim 1, wherein an anionic functional group of anionic-modified polyvinyl alcohol is one or more selected from the group consisting of carboxyl group, sulfo group, and phosphono group.

5. The method according to claim 4, wherein the anionic functional group is carboxyl group and/or sulfo group.

6. The method according to claim 1, wherein the agent further comprises polyvinyl alcohol.

* * * * *